(12) United States Patent
Stewart et al.

(10) Patent No.: US 12,143,804 B2
(45) Date of Patent: Nov. 12, 2024

(54) AUDIO AUGMENTATION SYSTEM AND METHOD

(71) Applicant: LENOVO (SINGAPORE) PTE. LTD, New Tech Park (SG)

(72) Inventors: Aaron M. Stewart, Raleigh, NC (US); Ellis Anderson, Greensboro, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 325 days.

(21) Appl. No.: 17/656,773

(22) Filed: Mar. 28, 2022

(65) Prior Publication Data

US 2023/0308826 A1 Sep. 28, 2023

(51) Int. Cl.
*H04S 7/00* (2006.01)
*H04R 3/12* (2006.01)
*H04R 5/02* (2006.01)
*H04S 3/00* (2006.01)

(52) U.S. Cl.
CPC ............ *H04S 7/303* (2013.01); *H04R 3/12* (2013.01); *H04R 5/02* (2013.01); *H04S 3/008* (2013.01); *H04S 2400/01* (2013.01); *H04S 2400/11* (2013.01)

(58) Field of Classification Search
CPC ...... H04S 7/303; H04S 3/008; H04S 2400/01; H04S 2400/11; H04S 7/302; H04S 2400/13; H04R 3/12; H04R 5/02; H04R 2227/003; H04R 27/00; H04N 7/15; H04N 7/18; H04N 21/4307
See application file for complete search history.

(56) References Cited

U.S. PATENT DOCUMENTS

| | | | |
|---|---|---|---|
| 10,848,712 B1* | 11/2020 | Rao | H04N 21/4307 |
| 11,049,511 B1* | 6/2021 | Seethaler | G10L 25/78 |
| 2002/0124097 A1* | 9/2002 | Isely | H04L 12/2838 |
| | | | 709/246 |
| 2011/0283008 A1* | 11/2011 | Smelyansky | H04N 7/15 |
| | | | 715/753 |
| 2013/0021432 A1* | 1/2013 | Kalipatnapu | H04M 3/562 |
| | | | 348/14.09 |
| 2021/0258427 A1* | 8/2021 | Lee | H04L 12/1831 |

* cited by examiner

*Primary Examiner* — Angelica M McKinney
(74) *Attorney, Agent, or Firm* — Dean D. Small; The Small Patent Law Group, LLC

(57) ABSTRACT

An audio augmentation system includes a memory and one or more processors that obtain a first audio stream generated by a first remote audio input device and a second audio stream generated by a second remote audio input device. The first and second audio streams are tagged with respective first and second source information. The processors assign the first audio stream to a first output setting based on the first source information, and assign the second audio stream to a different, second output setting based on the second source information. The processors control an audio output device to audibly emit the first audio stream according to the first output setting and the second audio stream according to the second output setting to acoustically differentiate the first audio stream from the second audio stream, independent of content of the first and second audio streams.

20 Claims, 3 Drawing Sheets

AUDIO AUGMENTATION SYSTEM AND METHOD

FIELD

The present disclosure generally relates to output of multiple audio streams from different sources.

BACKGROUND OF THE INVENTION

During video conference calls are remote collaboration events in which at least some participants are remote from other participants and are communicatively connected via network-connected computer devices. Remote collaboration events present engagement challenges. A given user's computer device may output, in real time, a multitude of different video streams and audio streams generated by the other computer devices connected to the remote collaboration event. During the event, as the conversation progresses, it can be difficult for a participant to decipher who is speaking at a given time. If the user is not able to identify the person speaking, the user may not fully comprehend or may misinterpret that person's ideas. This issue is particularly relevant in situations where, due to unfamiliarity with the voices of other participants and/or large sheer number of participants, the user is not able to identify the person speaking based on the person's voice characteristics (e.g., intonation, accent, etc.). The user lacks some of the auditory nuances that exist when people collaborate in person in a physical environment, such as auditory spatial localization. For example, during an in-person meeting, a user would be inherently able to localize the source of audio in terms of direction and distance, relative to the user's location, which indicates who is speaking. The user is not able to use auditory spatial localization during typical video conference calls because the video and audio streams are bundled together and transmitted to the user's computer device to be output.

Some unified communications systems that provide remote collaboration events may display a graphic indicator on a display device to identify a person that is vocalizing the audio that is currently being emitted, but this solution does not adequately resolve the engagement challenges. For example, this visual-based identification requires the user to monitor the graphic indicators, but the user's attention may be more appropriately directed to other visual content of the remote collaboration event, such as a document, a slideshow, shared content from a remote computer device, and the like. Furthermore, if multiple participants are speaking at the same time, the graphic indicators may not accurately and consistently identify the vocalization source.

A need remains for providing information to a user about respective sources of vocalized audio streams during remote collaboration events, to enhance the user's comprehension of the vocalized audio streams without relying on voice recognition or visually monitoring graphic indicators on a graphical user interface.

SUMMARY

In accordance with an embodiment, an audio augmentation system is provided that includes memory configured to store program instructions, and one or more processors operably connected to the memory. The program instructions are executable by the one or more processors to obtain a first audio stream generated by a first remote audio input device and a second audio stream generated by a second remote audio input device. The first audio stream is tagged with first source information and the second audio stream is tagged with second source information. The program instructions are executable by the one or more processors to assign the first audio stream to a first output setting based on the first source information, and assign the second audio stream to a second output setting based on the second source information. The second output setting is different from the first output setting. The one or more processors execute the program instructions to control an audio output device to audibly emit the first audio stream according to the first output setting and the second audio stream according to the second output setting to acoustically differentiate the first audio stream from the second audio stream, independent of content of each of the first and second audio streams.

Optionally, the one or more processors are configured to control the audio output device to concurrently audibly emit the first and second audio streams during a remote collaboration event. The first output setting may include different audio properties than the second output setting. The audio properties may represent one or more of volume settings, audio-out channels of the audio output device, output distributions among multiple speakers of the audio output device, supplementary background noises, or audio distortions. The one or more processors may assign the first audio stream to the first output setting for the audio output device to emit the first audio stream via only a first speaker of the audio output device, and may assign the second audio stream to the second output setting for the audio output device to emit the second audio stream via at least a second speaker of the audio output device.

Optionally, the one or more processors are configured to control the audio output device to emit the first audio stream via a first output distribution among multiple speakers of the audio output device, and to emit the second audio stream via a second output distribution among the multiple speakers of the audio output device. The audio output device according to the first output distribution allocates power to the multiple speakers differently than according to the second output distribution to enable spatial audio differentiation of the first and second audio streams.

Optionally, the first source information identifies one or more of the first remote audio input device, a first user that vocalizes audio captured by the first remote audio input device, an entity affiliated with at least one of the first remote audio input device or the first user, a position of the first user in a virtual environment, a role of the first user, or a proximity of the first user to the first remote audio input device. The one or more processors may receive a user command signal, and may assign the first audio stream to the first output setting based on both the first source information and the user command signal. The one or more processors may receive a user command signal, and may reassign the first audio stream to a third output setting based on the user command signal.

Optionally, the first audio stream includes speech of a first user near the first remote audio input device and the second audio stream includes speech of a second user near the second remote audio input device. The first source information may identify a position of the first user in a virtual environment, and the second source information may identify a position of the second user in the virtual environment. The one or more processors may assign the first audio stream to the first output setting based on the position of the first user in the virtual environment, and may assign the second audio stream to the second output setting based on the position of the second user in the virtual environment.

Optionally, the first source information identifies a first entity affiliated with one or more of the first remote audio input device or at least a first user that vocalizes audio captured by the first remote audio input device, and the second source information identifies a second entity affiliated with one or more of the second remote audio input device or at least a second user that vocalizes audio captured by the second remote audio input device. The one or more processors may assign the first audio stream to the first output setting based on the first entity, and may assign the second audio stream to the second output setting based on the second entity.

In accordance with an embodiment, a method is provided that includes obtaining a first audio stream generated by a first remote audio input device and a second audio stream generated by a second remote audio input device. The first audio stream is tagged with first source information, and the second audio stream is tagged with second source information. The method includes assigning the first audio stream to a first output setting based on the first source information, and assigning the second audio stream to a second output setting based on the second source information. The second output setting is different from the first output setting. The method includes controlling an audio output device to audibly emit the first audio stream according to the first output setting and the second audio stream according to the second output setting to acoustically differentiate the first audio stream from the second audio stream, independent of content of each of the first and second audio streams.

Optionally, controlling the audio output device includes controlling the audio output device to concurrently audibly emit the first and second audio streams during a remote collaboration event. Assigning the first audio stream to the first output setting and assigning the second audio stream to the second output setting may include assigning different audio properties for audibly emitting the first audio stream relative to the second audio stream. The audio properties may represent one or more of volume settings, audio-out channels of the audio output device, output distributions among multiple speakers of the audio output device, supplementary background noises, or audio distortions. Controlling the audio output device to audibly emit the first audio stream according to the first output setting may include controlling the audio output device to emit the first audio stream via only a first speaker of the audio output device, and controlling the audio output device to audibly emit the second audio stream according to the second output setting may include controlling the audio output device to emit the second audio stream via at least a second speaker of the audio output device.

Optionally, controlling the audio output device to audibly emit the first audio stream according to the first output setting includes controlling the audio output device to emit the first audio stream via a first output distribution among multiple speakers of the audio output device, and to emit the second audio stream via a second output distribution among the multiple speakers of the audio output device. The audio output device according to the first output distribution allocates power to the multiple speakers differently than according to the second output distribution to enable spatial audio differentiation of the first and second audio streams.

Optionally, the first audio stream includes speech of a first user near the first remote audio input device and the second audio stream includes speech of a second user near the second remote audio input device. The first source information may identify a position of the first user in a virtual environment, and the second source information may identify a position of the second user in the virtual environment. The first audio stream may be assigned to the first output setting based on the position of the first user in the virtual environment, and the second audio stream may be assigned to the second output setting based on the position of the second user in the virtual environment.

Optionally, the method further includes receiving a user command signal, and either (i) assigning the first audio stream to the first output setting based on both the first source information and the user command signal, or (ii) reassigning the first audio stream to a third output setting based on the user command signal. Optionally, assigning the first audio stream to the first output setting based on the first source information includes assigning the first audio stream based on an identification of one or more of the first remote audio input device, a first user that vocalizes audio captured by the first remote audio input device, an entity affiliated with at least one of the first remote audio input device or the first user, a position of the first user in a virtual environment, a role of the first user, or a proximity of the first user to the first remote audio input device.

In accordance with an embodiment, a computer program product is provided that includes a non-transitory computer readable storage medium. The non-transitory computer readable storage medium includes computer executable code configured to be executed by one or more processors to obtain a first audio stream generated by a first remote audio input device and a second audio stream generated by a second remote audio input device, wherein the first audio stream is tagged with first source information and the second audio stream is tagged with second source information. The computer executable code is configured to be executed by one or more processors to assign the first audio stream to a first output setting based on the first source information, and assign the second audio stream to a second output setting based on the second source information. The second output setting is different from the first output setting. The computer executable code is configured to be executed by one or more processors to control an audio output device to audibly emit the first audio stream according to the first output setting and the second audio stream according to the second output setting to acoustically differentiate the first audio stream from the second audio stream, independent of content of each of the first and second audio streams.

Optionally, the first output setting includes different audio properties than the second output setting. The audio properties may represent one or more of volume settings, audio-out channels of the audio output device, output distributions among multiple speakers of the audio output device, supplementary background noises, or audio distortions.

DETAILED DESCRIPTION

Figure 1:
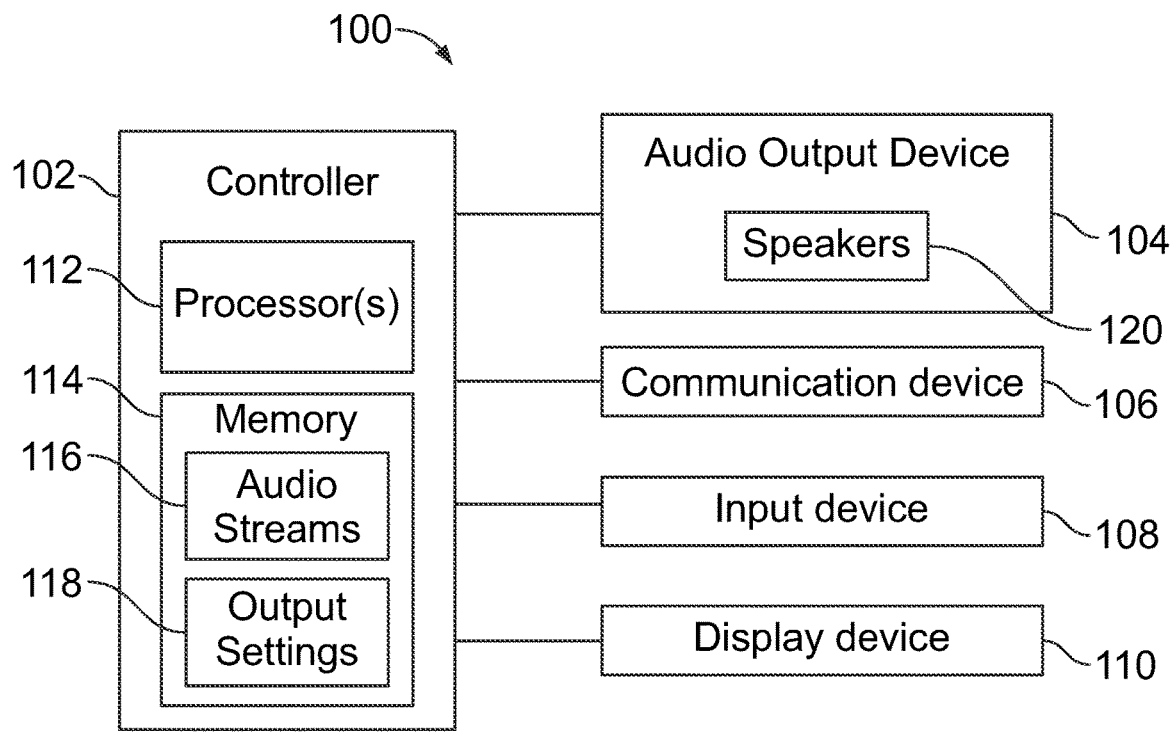
FIG. 1 is a block diagram of an audio augmentation system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments described herein disclose an audio augmentation system that audibly emits multiple audio streams from an audio output device according to different output settings to enable a listening user to acoustically differentiate at least two of the audio streams, independent of the content of the at least two audio streams. The audio augmentation system may acoustically differentiate a first audio stream from a second audio stream by controlling the audio output device to audibly emit the first audio stream using different audio properties than the audio output device uses to audibly emit the second audio stream. For example, audio of a first remote user and audio of a second remote user may be assigned to different audio-out channels, such that the audio output device generates the audio of the first remote user via a different set of one or more speaker devices than are used to generate the audio of the second remote user. The listening user can perceive the acoustic differences in how the audio output device emits the different streams. The acoustic differences present information to the listening user, which can be used to enhance or augment the comprehension of the listening user to the audio streams. For example, the acoustic differences differentiate the audio streams, which provides an indication that the source of the first audio stream is different from the source of the second audio stream. In another example, the acoustic differences may be used to provide information about one or both of the sources of the first and second audio streams. The acoustic differences may highlight (e.g., isolate) the audio from a specific participant during a remote collaboration event, such as a person having a distinguished role during the remote collaboration event (e.g., presenter), a person having a distinguished employment title (e.g., boss or president), a distinguished guest (e.g., potential client), or the like. Additional examples of use applications of the audio augmentation system are described herein in more detail with reference to the appended drawings. The audio augmentation system provides information to the listening user, based on the acoustic differentiation of the audio streams, without distracting the listening user by requiring visual attention or mental concentration for voice recognition.

In an embodiment, the audio augmentation system is adaptable to user selections. For example, a user may utilize an input device to submit user input commands. The user input commands may assign or modify the assignment of one or more audio streams to corresponding output settings. The user can select which audio streams are acoustically differentiated from other audio streams, in order to provide desired source information to the user. Furthermore, the audio augmentation system described herein may incorporate artificial intelligence (AI) machine learning algorithms for intelligently assigning audio streams to different output settings based on context.

References herein to "machine learning" and "artificial intelligence" refer to algorithms that learn from various automatic or manual feedback, such as observations and/or data. The artificial intelligence algorithms may be adjusted over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks, and/or the like.

References herein to "computer device", unless specified, shall mean any of various types of hardware devices that perform processing operations, such as servers, computer workstations, personal computers (e.g., laptop, desktop, tablet, smart phone, wearable computer, etc.), standalone video conference hub devices or stations, and the like.

FIG. 1 is a block diagram of an audio augmentation system 100 according to an embodiment. The audio augmentation system 100 assigns input audio streams to different output settings to enable acoustic differentiation of the input audio streams, and potentially identification of a source of at least one of the audio streams. The image alteration system 100 includes a controller 102 that performs some or all of the operations described herein to assign and differentiate the audible emission of the audio streams. The audio augmentation system 100 may also include an audio output device 104, a communication device 106, an input device 108, and/or a display device 110. The controller 102 is operably connected to the other components of the audio augmentation system 100 via wired and/or wireless communication links to permit the transmission of information in the form of signals. For example, the controller 102 may generate control signals that are transmitted to the other components to control operation of the components. The audio augmentation system 100 may have additional components that are not shown in FIG. 1. In an alternative embodiment, the audio augmentation system 100 may lack one or more of the components that are shown in FIG. 1.

The controller 102 represents hardware circuitry that includes and/or is connected with one or more processors 112 (e.g., one or more microprocessors, integrated circuits, microcontrollers, field programmable gate arrays, etc.). The controller 102 includes and/or is connected with a tangible and non-transitory computer-readable storage medium (e.g., data storage device), referred to herein as memory 114. The memory 114 may store program instructions (e.g., software) that are executed by the one or more processors 112 to perform the operations described herein. The program instructions may include one or more algorithms utilized by the one or more processors 112 to analyze source information tagged with audio streams and assign different output settings to the audio streams based on the source information that is analyzed. The program instructions may dictate actions to be performed by the one or more processors 112, such as generating control signals to control the audio output device 104 to audibly emit the audio streams according to the assigned output settings. The memory 114 may store additional information that is used by the audio augmentation system. For example, the memory 114 may include an audio stream database 116 for storing multiple audio streams received from different remote audio input devices, as described herein. The memory may also include an output setting library or database 118 that provides a list of different output settings. The output settings refer to audio properties of how the audio output device 104 is controlled to audibly emit each of the audio streams. The output settings may refer to specific audio-out channels (e.g., speakers 120) of the audio output device that are powered to generate each audio stream, specific volumes, specific levels of distortion, specific supplementary background noises, and/or the like. The memory 114 optionally may store applications, such as various application program interfaces (APIs) that link to cloud hosting services, via the communication device 106, for accessing information from remote storage devices, such as servers.

The audio output device 104 includes one or more speaker devices 120, referred to herein as speakers. The speakers 120 are controlled to audibly emit audio streams for perception by a user. For example, each speaker 120 may be an electroacoustic transducer that converts an electrical audio signal into a corresponding sound. The audio output device 104 may include multiple speakers 120 for providing stereo sound, surround sound, and/or the like. The multiple speakers 120 may be connected to amplifiers and other power circuitry of the audio output device 104 via audio-out channels. For example, a first speaker 120 may be controlled to emit sound based on first electrical signals transmitted along a first audio-out channel, and a second speaker 120 may be controlled to emit sound based on second electrical signals transmitted along a second audio-out channel. In an embodiment, different audio-out channels may be associated with a left speaker 120, a right speaker 120, a center speaker 120, a left rear (e.g., surround) speaker 120, a right rear (e.g., surround) speaker 120, a subwoofer speaker 120, and/or the like.

The communication device 106 represents hardware circuitry that can communicate electrical signals via wireless communication pathways and/or wired conductive pathways. The controller 102 may receive audio streams and video streams generated by remote devices via the communication device 106. For example, during a remote collaboration event (e.g., a conference call), the communication device 106 may concurrently receive multiple audio streams generated by different remote input audio devices in real time. Optionally, the communication device 106 may also receive multiple video streams generated by different remote camera devices in real time. The communication device 106 may include transceiving circuitry, one or more antennas, and the like, for wireless communication. The communication device 106 may communicate with a cellular tower, a modem, a router, and/or the like.

The input device 108 is designed to generate user command signals (e.g., selections) for interacting with the audio augmentation system 100 based on interactions from a user. The input device 108 may include or represent a touch sensitive screen or pad, a mouse, a keyboard, a joystick, a switch, a microphone, physical buttons, and/or the like. The user may actuate the input device 108 to generate the user command signals that are conveyed to the controller 102. The user command signals may be submitted to control operation of the audio augmentation system 100. For example, a user may utilize the input device 108 to select which output setting to assign to a given audio stream and/or to change the output setting already assigned to the audio stream.

The display device 110 includes a display screen that presents graphical indicia, such as text and symbols, for viewing by the user. The display device 110 may display a graphical user interface (GUI) of an application or website, such as the application or website of a video conferencing platform.

Figure 2:
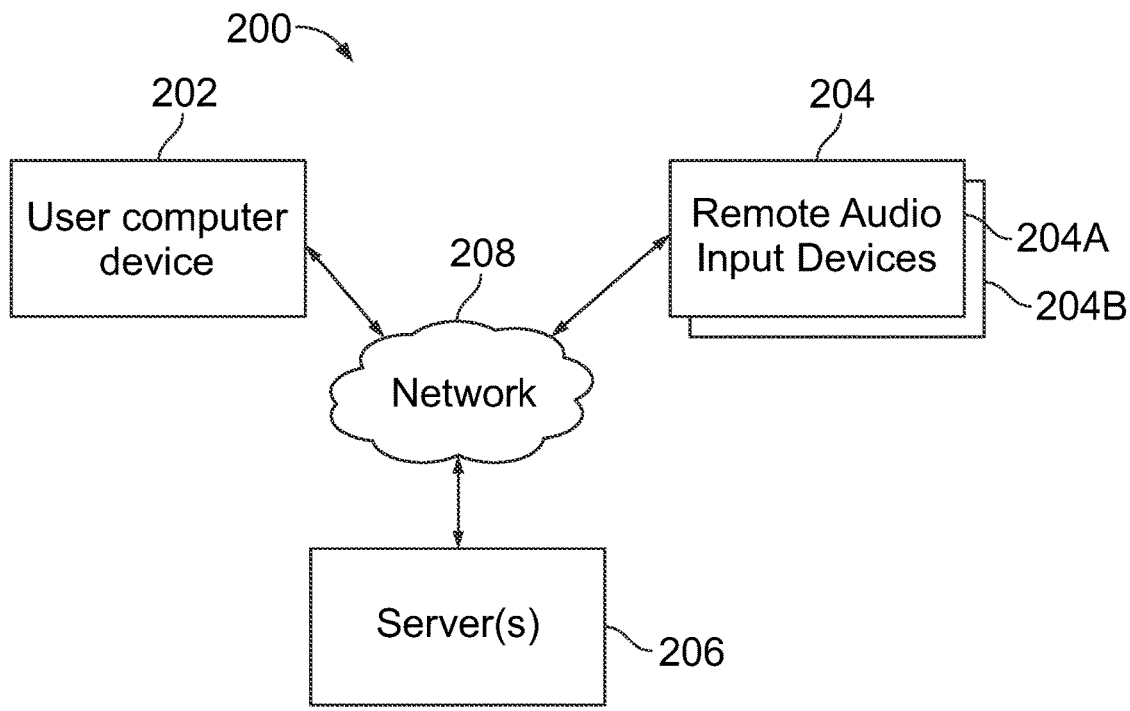
FIG. 2 is a diagram of a communication system the incorporates the audio augmentation system according to an embodiment.

FIG. 2 is a diagram of a communication system 200 that incorporates the audio augmentation system 100 according to an embodiment. The communication system 200 includes a user computer device 202, remote audio input devices 204, and one or more servers 206. In an embodiment, at least most of the components of the audio augmentation system 100 shown in FIG. 1 are within the user computer device 202 or connected to the user computer device 202 via a wired or short-range wireless connection. For example, the audio output device 104, the communication device 106, the input device 108, and the display device 110 may be commonly held within and/or on a housing or case of the user computer device 202. The user computer device 202 may be a smartphone, a tablet computer, a laptop computer, a desktop computer, a wearable computer, or the like. Alternatively, the audio output device 104 may be discrete from the user computer device 202 and connected to the user computer device 202 via a Bluetooth connection, a local area network (LAN) connection, a wired connection, or the like. For example, the audio output device 104 may be a wireless speaker device, headphones, or the like.

The remote audio input devices 204 and the servers 206 may be external and remote from the user computer device 202. For example, the servers 206 may be located at a data center. The remote audio input devices 204 may be located at different residences, offices, or the like. The user computer device 202 may be communicatively connected to the remote audio input devices 204 and the servers 206 via a network 208. The network 208 may be the Internet, a local area network, or the like. The servers 206 may provide various cloud-based services to the user computer device 202 via the network 208. The services may include data storage. The user computer device 202 represents a computer device that performs at least some of the operations of the audio augmentation system 100. For example, the remote audio input devices 204 may include at least a first remote audio input device 204A and a second remote audio input device 204B. The user computer device 202 may communicate with the servers 206 and/or the remote audio input devise 204A, 204B during a remote collaboration device, such as a video conference call.

During the remote collaboration event, the first and second remote audio input devices 204A, 204B capture audio to generate respective first and second audio streams. The remote audio input devices 204 include audio sensors (e.g., microphones) for capturing audio in the respective vicinity of the remote audio input devices 204. For example, the remote audio input devices 204 may include transducers that convert sound to electrical audio signals over time which represent the different audio streams. In an example, a first remote input device 204A may be located at the residence of a first remote person (referred to herein as a collaborator), and a second remote input device 204B may be located at the office of at least a second remote collaborator. The first remote input device 204A captures the vocalized audio (e.g., speech) of the first remote collaborator to generate a first audio stream. The second remote input device 204B captures the vocalized audio (e.g., speech) of the second remote collaborator to generate a second audio stream. Optionally, there may be multiple collaborators present in the proximity of the first remote input device 204A and/or the second remote input device 204B, such that the first audio stream and/or the second audio stream may capture voices of more than one person. The remote audio input devices 204 optionally may represent components of computer devices, such as laptops, tablet computers, desktop computers, standalone video conferencing hub devices, workstations, smartphones, and/or the like.

The servers 206 may receive the audio streams from the remote audio input devices 204 via the network 208. In an embodiment, the audio streams are tagged with source information. The tagging may be performed by the servers 206 or remote computer devices that are connected to and/or include the remote audio input devices 204. The source information is associated with a source of the audio content that is captured in the corresponding audio stream, and provided information about the source. The source may refer to the remote audio input device 204 that generates the audio stream and/or the person or people that vocalize audio captured by the remote audio input device 204 to generate the audio stream. For example, the first audio stream that is generated by the first remote audio input device 204A is tagged with first source information that relates to the first remote audio input device 204A itself and/or at least a first user (e.g., first collaborator) that vocalizes audio that is captured in the first audio stream.

One example of source information that may be tagged to an audio stream is an identification of the specific remote audio input device 204 that generated the audio stream, such as the model number, serial number, device number, or the like. Another example of source information may include a user identification of a user (e.g., collaborator) that vocalizes audio captured in the audio stream, such as a name of the user, a job title of the user, an identification number of the user, a profile name of the user (e.g., for a profile or account of a video conferencing platform), or the like. Another example of source information may include a role of the user that is vocalizing audio. The role may be in relation to a remote collaboration event. For example, one role could be that of a content presenter and/or organizer of the collaboration event. The controller 102 of the audio augmentation system 100 may use the tagged identification of the audio stream that contains the presenter's voice to specifically isolate or highlight (e.g., spotlight, underscore) that audio stream relative to one or more other audio streams. Other roles may be based on a business employment hierarchy (e.g., boss and/or president, salaried employee, intern, etc.) or the like.

Yet another example of source information may include an entity affiliated with the remote audio input device 204 and/or the user. The entity may be a company that owns or controls the audio input device 204 and/or employs the user. The entity alternatively may be a different type of group or association, such as a club, a union, a worship group, a sports team, or the like.

In another example, the source information may identify a proximity of the user that is vocalizing audio to the remote audio input device 204. For example, processing circuitry within the remote audio input device 204 may analyze the volume of the sounds captured and estimate a distance of the user from the remote audio input device 204. The proximity information may help to identify the specific user or a group in which the user is associated. For example, a first group of one or more users may be near the remote audio input device 204 (e.g., within a proximity threshold of the device 204), and a second group (e.g., the background or gallery) of one or more users may be farther away from the remote audio input device 204 (e.g., beyond the proximity threshold).

In yet another example, the source information may include a position of a user that is vocalizing audio in a virtual environment. The position of the user may refer to a relative position of a graphic indicia or representation of the user. For example, during a remote collaboration event, a graphic user interface may display a mosaic video gallery that concurrently shows multiple video feeds of different collaborators. The source information that is tagged with an audio stream may include a position of the video associated with that audio stream relative to the gallery and/or the other video feeds in the gallery. In another example, the remote collaboration event may include virtual avatars associated with different users that are collaborating. The virtual avatars may be disposed within a virtual environment, such as a virtual meeting room. The source information may identify a position of the avatar that represents the user speaking within the audio stream. The position of the avatar may be relative to other avatars and/or relative to the virtual environment.

In an embodiment, the controller 102 of the audio augmentation system 100 receives multiple audio streams tagged with respective source information. If the audio streams are received in a bundle, the controller 102 may parse the individual audio streams. The controller 102 may analyze the source information tagged with each of the audio streams, and assign output settings to the audio streams based at least in part on the source information. The output settings may dictate how the audio streams are audibly emitted by the audio output device 104. For example, a first output setting may have a different audio property than a second output setting, as described herein. When the first and second audio streams are audibly emitted, the observer may be able to perceive the difference in the audio properties, which indicates at least that the first and second audio streams have different sources.

In an embodiment, the operations of the audio augmentation system 100 may be distributed between at least two of the user computer device 202, the servers 206, and remote computer devices that include or are connected to the remote audio input devices 204. For example, the remote audio input devices 204 may generate the different audio streams and transmit the audio streams via the network 208 to the remote server(s) 206. The remote computer devices and/or the server(s) 206 may tag the audio streams with the source information. The source information may be tagged to the audio streams as metadata. During a remote collaboration event, the server(s) 206 may transmit, in real time, a bundle of multiple tagged audio streams to the user computer device 202. The server(s) 206 may also transmit a bundle of video streams to the user computer device 202. The video streams may be generated by cameras connected to the remote computer devices.

In an embodiment, the audio augmentation system 100 may be integrated with a remote collaboration platform. For example, the operations of the controller 102 may be incorporated into the program instructions of a video conferencing or video streaming application that is downloaded onto the user computer device 202. Although remote collaboration is one application, the audio augmentation system 100 may not be limited to remote collaboration events. For example, the audio augmentation system 100 described herein may be applicable to any situation in which multiple audio streams are audibly delivered to an observer, where acoustic differentiation of the audio streams could help the observer distinguish the sources.

Figure 3:
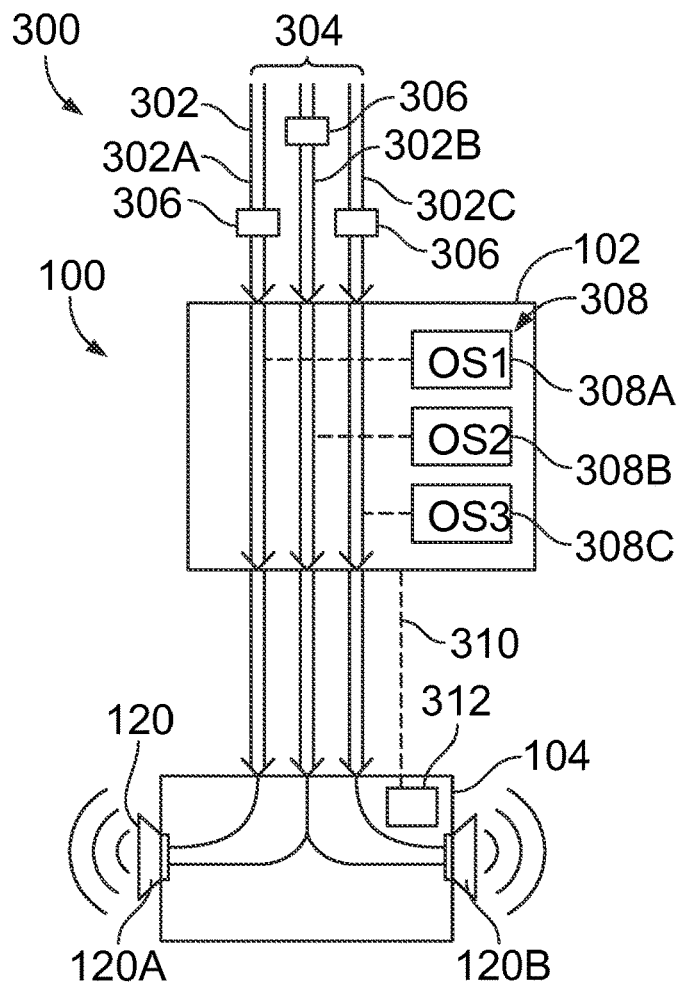
FIG. 3 is a schematic diagram illustrating operation of the audio augmentation system according to an embodiment.

FIG. 3 is a schematic diagram 300 illustrating operation of the audio augmentation system 100 according to an embodiment. The controller 102 obtains multiple audio streams 302 that are generated by different remote audio input devices 204. In the illustrated embodiment, the controller 102 obtains three audio streams 302 including a first stream 302A, a second stream 302B, and a third stream 302C. The first audio stream 302A may be generated by the first remote audio input device 204A (shown in FIG. 2), the second audio stream 302B may be generated by the second remote audio input device 204B, and the third audio stream 302C may be generated by a third remote audio input device 204. In an embodiment, the audio streams 302 may be concurrently communicated to the controller 102 in a bundle 304. The bundle 304 may be received from the one or more servers 206 via the network 208. The three streams 302A-C may be audio streams of a remote collaboration event, and may be communicated in real-time during the remote collaboration event to enable live interactions between the collaborators (e.g., users) that participate in the remote collaboration event. Although not shown, the bundle 304 may also include video streams. Although three audio streams 302A-C are shown in the illustrated example, the controller 102 may receive only two audio streams 302, four audio streams 302, or more than four audio streams 302 during other remote collaboration events and/or in other embodiments of the audio augmentation system 100.

Each of the audio streams 302 is tagged with source information 306 related to the respective source of the specific audio stream 302. For example, the first audio stream 302A is tagged with first source information 306 related to a source of the first audio stream 302A. The second and third audio streams 302B, 302C are similarly tagged with respective second and third source information 306 related to the respective sources of the second and third audio streams 302B, 302C. The source information 306 may be included in the bundle 304. Upon receipt of the bundle 304, the controller 102 may unpack the bundle 304 to parse out the different audio streams 302 and analyze the source information 306 associated with each audio stream 302.

In an embodiment, the controller 102 assigns the audio streams 302 to different output settings 308 based on the source information. For example, the controller 102 may assign the first audio stream 302A to a first output setting 308A based on the first source information 306. The controller 102 may assign the second audio stream 302B to a second output setting 308B based on the second source information 306, and may assign the third audio stream 302C to a third output setting 308C based on the third source information 306. The output settings 308 represent audio properties that the audio out device 104 employs to audibly emit the corresponding audio streams 302. The audio properties may include volume settings, audio-out channels, output distributions among multiple speakers 120 of the audio output device 104, supplementary background noises, audio distortions, and/or the like. In an embodiment, the first, second, and third output settings 308A-C may be different from each other. As a result, the three audio streams 302A-C may be audibly emitted in at least slightly different ways by the audio output device 104. For example, the different output settings 308 may cause the audio output device 104 to emit the audio streams 302 at different volume levels, at different levels of distortion, via different individual speakers, via different combinations of speakers (e.g., for spatial sound production), with different supplementary background noises, and/or the like. These variations may allow a listener to acoustically differentiate the different audio streams 302A-C independent of the content of the audio streams 302A-C. The content of an audio stream 302 refers to the words that are being vocalized as well as the way that the user is vocalizing the words (e.g., the user's voice, accent, intonation, etc.). Hypothetically, even if the first audio stream 302A and the second audio stream 302B are exact copies of each other, if the audio output device 104 audibly emits the two streams 302A, 302B according to different output settings 308A, 308B, a listener would be able to perceive a difference in the two audio streams 302A, 302B that are emitted.

In the illustrated embodiment, the controller 102 assigns all three of the audio streams 302A-C to a different output setting 308. As a result, a listener to the audio output device 104 may be able to acoustically differentiate each of the three audio streams 302A-C, independent of content. In another embodiment, the controller 102 may assign two or more streams 302 to the same output setting 308. For example, the controller 102 may assign the first stream 302A to the first output setting 308A based on the first source information 306 indicating that the first stream 302A is associated with a specific prominent role, such as presenter of a remote collaboration event. Due to the prominent role, the controller 102 may isolate the first stream 302A for enabling a user listening to the audio streams 302 to easily identify when the presenter is speaking, without the user relying on voice interpretation. Upon determining that the second and third streams 302B, 302C do not represent users with prominent roles (and there is no known reason to acoustically differentiate the second and third streams 302A, 302C), the controller 102 may assign the same output setting 308 (e.g., the second output setting 308B) to both the second and third streams 302B, 302C. During the remote collaboration event, the output audio device 104 may emit the first stream 302A differently than the second and third streams 302B, 302C, which enables a listening user to identify when the presenter is speaking based at least on the acoustic differentiation.

After assigning the output settings 308 to the audio streams 302, the controller 102 controls the audio output device 104 to audibly emit the different audio streams 302 according to the assigned output settings 308. In an embodiment, the controller 102 may convey the audio streams 302 to the audio output device 104, and may generate a control signal 310 that indicates the output settings 308 assigned to each of the audio streams 302. The control signal 310 may be an electrical signal that is communicated with the audio streams 302 to the audio output device 104. At the audio output device 104, control circuitry 312 of the audio output device 104 may receive and analyze the control signal 310. The control circuitry 312 may direct the audio streams 302 to different speakers 120, amplifiers, and the like, based on the output settings 308 in the control signal 310.

In an alternative embodiment, rather than communicate the audio streams 302 to the output device 104 with a control signal 310 that instructs how to emit the audio streams 302, the controller 102 may distribute and/or modify the audio streams 302 internally, before communicating the audio streams 302 to the audio output device 104. For example, the speakers 120 of the audio output device 104 may be connected to different audio-out channels. According to the first output setting 308A assigned to the first audio stream 302A, the controller 102 may direct the first audio stream 302A, via one or more switch devices, to a first audio-out channel that is connected to a first speaker 120A. According to the third output setting 308C, the controller 102 may direct the third audio stream 302C, via the one or more switch devices, to a second audio-out channel that is connected to a second speaker 120B. As a result, only the first speaker 120A audibly emits the first stream 302A and only the second speaker 120B audible emits the third stream 302C. The first speaker 120A may be a left speaker according to a speaker arrangement, and the second speaker 120B may be a right speaker according to the speaker arrangement. The listening user would hear the first stream 102A out of the left speaker 120A and the third stream 102C out of the right speaker 120B, which acoustically indicates that the sources of the first and third streams 102A 102C are different.

Continuing with the left and right speaker example, the second output setting 308B may command that the second audio stream 302B be emitted from both the left speaker 120A and the right speaker 120B. The controller 102 may direct the second audio stream 302B to both the first and second audio-out channels for both the first and second speakers 120A, 120B to audibly emit the second stream 302B (or to a third audio-out channel that is connected to both speakers 120A, 120B). Optionally, if a third speaker 120 (e.g., center speaker) is available, the controller 102 may direct the second audio stream 302B to a third audio-out channel that is connected to the third speaker 120 (instead of directing the stream 302B to both the first and second audio-out channels).

The audio output device 104 may concurrently audibly emit the audio streams 302A-C via the speakers 120. Some of the audio streams 302 may be relatively quiet at times that collaborators are talking on other audio streams 302, such as during a remote collaboration event. The audio augmentation system 100 provides audible cues that signal information to a listener, independent of the content of the audio streams 302.

The illustrated example uses two different speakers 120A, 102B to emit the audio streams 302 that have different assigned output settings 308. Optionally, the audio output device 104 may include more than two speakers 120. As such, the third stream 302C may be assigned to a center speaker, a rear or surround speaker, or the like. The output settings 308 optionally may assign audio streams 302 to different sets of one or more speakers 120. For example, the first stream 302A may be assigned to the first speaker 120A only, and the second stream 302B may be assigned to the first speaker 120A and at least one other speaker 120, or to multiple speakers 120 that do not include the first speaker 120A. The speakers 120 may have different locations relative to the user's ears, such that audio emitted by one speaker 120 is spatially perceived by the user as coming from a different source location than audio emitted by a different speaker 120 in a different location.

In another example, two different output settings 308 may utilize the same speakers 120 to emit audio, but may have a different output distributions among the speakers 120. The output distributions refer to the distribution of power to the speakers 120. The audio output device 104 according to a first output distribution allocates power to the multiple speakers 120 differently than according to a second output distribution to enable spatial audio differentiation of the first and second audio streams 302A, 302B. For example, the first output distribution may allocate power 50:50 between a center speaker 120 and a left speaker 120, and the second output distribution may allocate power 50:50 between the center speaker 120 and a right speaker 120. In this example, the user would perceive the first audio stream 302A as originating from a center-left position, and would perceive the second audio stream 302B as originating from a center-right position.

In another example, two different output settings 308 may designate different volume settings. For example, the first and second output settings 308A, 308B may dictate that the output device 104 emit the first stream 302A at a louder volume than the second stream 302B. Two different output settings 308 may designate different distortion levels or other audio properties at which two or more audio streams 302 are audibly emitted. For example, the first and second output settings 308A, 308B may dictate that the output device 104 emit the first stream 302A at a greater distortion level than the second stream 302B. In another example, one or more of the output settings 308 may instruct the addition of a supplementary background noise. For example, the first output setting 308A may instruct that the audio output device 104 audibly emit the first stream 302A overlaid with a white noise track or another designated sound as background. The second output setting 308B may not assign any supplemental background noise added to the second stream 302B. As such, the user may distinguish the sources of the audio streams 302A, 302B due to the perception of a faint background noise when the person or people of the first stream 302A speak.

In an example application, the first source information 306 of the first stream 302A identifies a first entity. The first entity may be a Company A that employs at least a first user that vocalizes audio captured in the first audio stream 302A. For example, it is possible that the first user may be in a room with other employees of the Company A who are all collaborating in a conference call. The second and third source information 306 may identify a second entity, which is Company B in this example. Company B employs at least a second user that vocalizes audio captured in the second audio stream 302B and a third user that vocalizes audio captured in the third audio stream 302C. During a remote collaboration event, it may be helpful to provide an indication of which company the person currently speaking is affiliated with. For example, the controller 102 may assign the first audio stream 302A to an output setting 308A that is different from the output setting 308B assigned to the second and third audio streams 302B, 302C. As a result, the audio output device 104 audibly emits the first audio stream 302A with different audio properties than the second and third audio streams 302B, 302C. The user listening to the audio output device 104, such as at the user computer device 202, is able to perceive which people speaking are from Company A and which people speaking are from Company B based on the acoustic variation provided by the audio output device 104.

Figure 4:
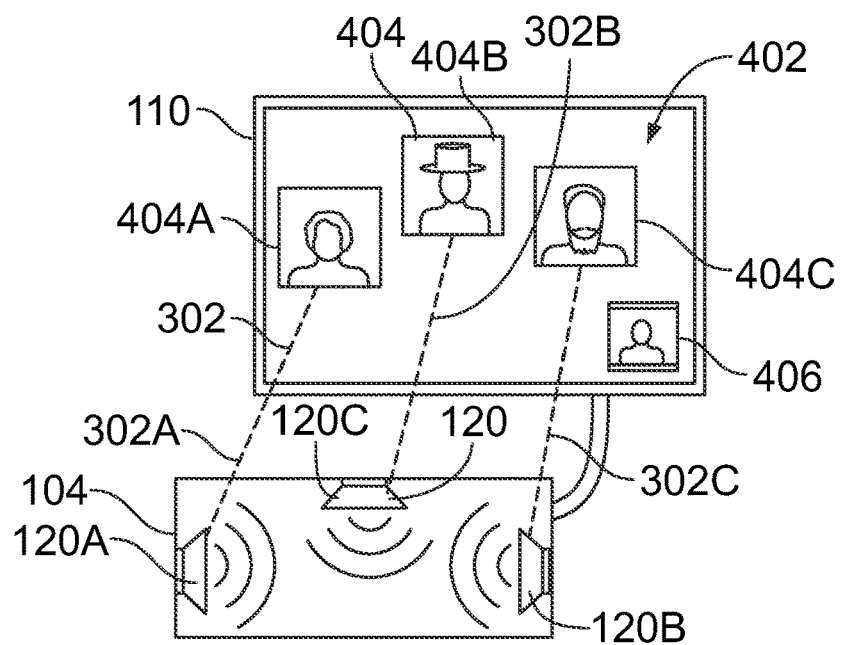
FIG. 4 illustrates a display device and an audio output device of the audio augmentation system according to an embodiment.

FIG. 4 illustrates the display device 110 and the audio output device 104 of the audio augmentation system 100 according to an embodiment. In the illustrated embodiment, the audio streams are assigned different output settings based on the positions of users, that vocalize audio in the audio streams, in a virtual environment. The positions of the users may refer to positions of graphical representations of the users within the virtual environment. In the illustrated example, the display device 110 is controlled to display a GUI 402 that includes three remote collaborator video streams 404 and a self-directed video stream 406. The self-directed video stream 406 shows a first user that is positioned in front of the display device 110 and viewing the GUI 402. The remote collaborator video streams 404 show different remote collaborators that are participating with the first user in a remote collaboration event, such as a video conference call. Each of the remote collaborator video streams 404 may be associated with a different audio stream 302 that is received by the controller 102 (shown in FIG. 3).

In the illustrated embodiment, the GUI 402 may represent the virtual environment. A second collaborator video stream 404B is located between a first collaborator video stream 404A and a third collaborator video stream 404C. The audio streams 302 may be tagged with the positional information of the associated video stream, either relative to the other video streams, relative to bounds of the GUI, and/or according to coordinates of the GUI. The controller 102 may assign the output settings to the audio streams 302 based on this virtual positional information. For example, a first audio stream 302A that is associated with the first collaborator video stream 404A may be assigned to a left speaker 120A because the first collaborator video stream 404A is to the left of the other collaborator video streams 404B, 404C. A second audio stream 302B that is associated with the second collaborator video stream 404B may be assigned to a center speaker 120C, and a third audio stream 302C associated with the third collaborator video stream 404C may be assigned to a right speaker 120B. As such, the first collaborator's voice is emitted from the left speaker 120A, the second collaborator's voice is emitted from the center speaker 120C, and the third collaborator's voice is emitted from the right speaker 120B, according to the positions of the video streams 404 on the GUI 402.

The same concept can be applied in virtual reality applications. For example, the same user and remote collaborators may participate in a remote collaboration event. The event may be visually displayed as multiple avatars together within the same virtual room, such as a virtual conference room, where each person is represented by a respective avatar. The virtual positional information used to assign the output settings to the audio streams may be determined by the controller 102 based on the locations and/or orientations of the avatars in the virtual room. For example, if a first remote collaborator's avatar is located behind the avatar of the first user at the user computer device 202, then an audio stream that captures that first remote collaborator's voice may be assigned to be audibly emitted by one or more rear speakers of the audio output device. This function would allow the first user to perceive that the speech is actually emanating from the avatar behind the user's own avatar, allowing the first user to quickly identify the source of the audio, independent of the content.

In at least one embodiment, the audio augmentation system 100 is user-configurable. For example, a user may interact with the input device 108 (shown in FIG. 1) to generate user command signals that are communicated to the controller 102. Optionally, the user may generate the user command signals using a discrete device, such as a smartphone, which wirelessly transmits the user command signals to the communication device 106. The user command signals may control or affect the assignment of audio streams to output settings.

For example, the controller 102 may enable a user to select which audio streams (e.g., which source information) is assigned to each of different permitted output settings. The controller 102 may display a dialogue box on the display device 110 that prompts the user to make selections. The dialogue box may display the source information that is tagged with each of the streams. This may occur during a set-up process that generates a user profile. The same settings may be applied automatically to future remote collaboration events when the user profile is selected. In one example, the user may be particularly interested in the words spoken by a specific remote collaborator, so the user may submit a user command signal for the controller 102 to differentiate that audio stream from other audio streams. In another example, the controller 102 may notify the user (e.g., via a dialogue box displayed on the display device 110) that there is a mix of attendees from the user's own company as well as from outside the user's company. The controller 102 may prompt the user to select whether the user would like the system 100 to differentiate the audio of collaborators within the user's company relative to the audio of collaborators outside of the company. When a user command signal is received, the controller 102 may assign the output settings to the audio streams based on both the source information and the user command signal.

Furthermore, the user may submit user command signals to change a pre-existing assignment of output settings to one or more audio streams. For example, during a remote collaboration event, the user may decide to reduce the volume of one or more audio streams relative to other streams and/or increase the volume of one or more audio streams relative to other streams. The user may reduce the volume of a stream that the user considers distracting, and may accomplish this task by generating a user command signal to change the assigned output setting for that stream.

In an embodiment, the audio augmentation system 100 may use AI machine learning algorithms to monitor audio streams and determine source information that is then used to assign the audio streams to different output settings. As one example, the controller 102 may use machine learning techniques to identify audio streams that have significant background chatter. The controller 102 may automatically assign the streams with background chatter to rear audio-out channels that are connected to rear speakers, while the audio from an active presenter is supplied through at least one front audio-out channel. The determination of background chatter may be based on dB level of incoming audio, an estimation of proximity of the source to the remote audio input device, an analysis of the audio waveform, and/or the like.

In another example, the controller 102 may invoke machine learning techniques to identify the audio stream that includes the person who is speaking the most during a remote collaboration event. The controller 102 may then tag the audio stream to identify that stream as associated with a lead or primary collaborator role (e.g., VIP role). The controller 102 may assign a unique audio-out channel to the audio stream that includes the lead collaborator, and may assign other streams to a different audio-out channel in order to isolate and/or highlight the lead collaborator. Conversely, based on contextual information during a collaboration event, the controller 102 may identify a collaborator as distractive (e.g., a negative influence), and therefore may assign the audio stream that carries that distractive person's voice to a quieter volume, less observable audio-out channel, and/or the like, to alleviate the distraction.

The machine learning techniques may be combined with the user-configurable aspects described above. For example, upon determining that a first collaborator is speaking more than other collaborators, the controller 102 may control the display device 110 to display a dialogue box. The dialogue box may prompt the user whether the user would like to isolate (e.g., highlight or underscore) the audio stream that includes the first collaborator's voice.

Figure 5:
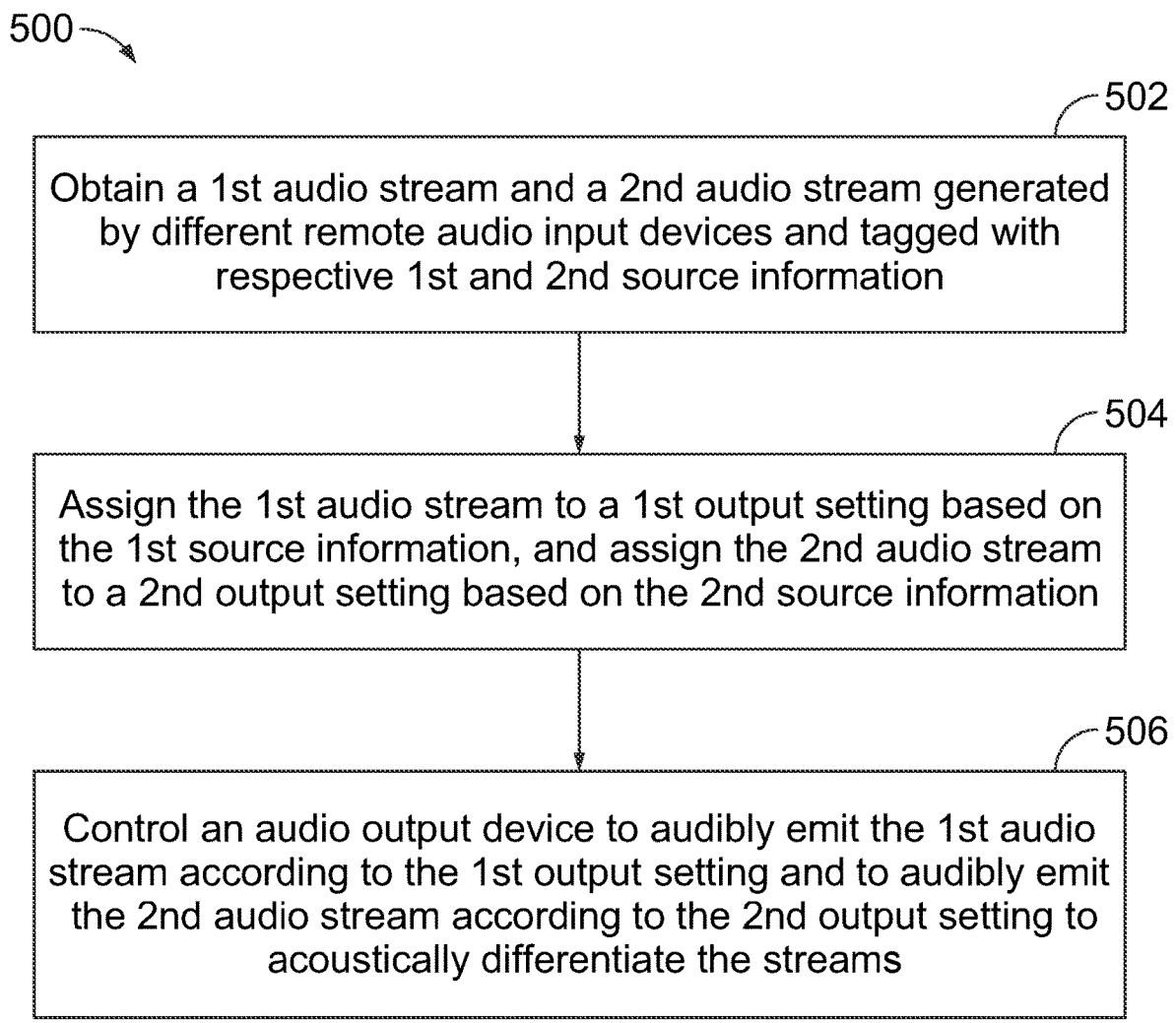
FIG. 5. is a flow chart of a method of differentiating the acoustic emission of audio streams according to an embodiment.

FIG. 5 is a flow chart 500 of a method of differentiating the acoustic emission of audio streams according to an embodiment. The method may be performed by the controller 102, such as the one or more processors 112 thereof. The method optionally may include at least one additional step than shown, at least one fewer step than shown, and/or at least one different step than shown.

At step 502, the controller 102 obtains a first audio stream 302A generated by a first remote audio input device 204A and a second audio stream 302B generated by a second remote audio input device 204B. The first audio stream 302A is tagged with first source information 306, and the second audio stream 302B is tagged with second source information 306. The first source information may identify the first remote audio input device, a first user that vocalizes audio captured by the first remote audio input device, an entity affiliated with at least one of the first remote audio input device or the first user, a position of the first user in a virtual environment, a role of the first user, and/or a proximity of the first user to the first remote audio input device. The second source information may identify the second remote audio input device, a second user that vocalizes audio captured by the second remote audio input device, an entity affiliated with at least one of the second remote audio input device or the second user, a position of the second user in a virtual environment, a role of the second user, and/or a proximity of the second user to the second remote audio input device.

At step 504, the controller 102 assigns the first audio stream 302A to a first output setting 308A based on the first source information 306 and assigns the second audio stream 302B to a second output setting 308B based on the second source information 306. The second output setting 308B is different from the first output setting 308A. The first and second output settings 308A, 308B have different audio properties, such that different audio properties are assigned for emitting the first audio stream 302A relative to the second audio stream 302B. The audio properties may include volume settings, audio-out channels of the audio output device, output distributions among multiple speakers of the audio output device, supplementary background noises, and/or audio distortions.

At step 506, the controller 102 controls an audio output device 104 to audibly emit the first audio stream 302A according to the first output setting 308A and to audibly emit the second audio stream 302B according to the second output setting 308B, in order to acoustically differentiate the first audio stream 302A from the second audio stream 302B. The streams 302A, 302B are acoustically differentiated independent of the content of each of the first and second audio streams 302A, 302B. The controller 102 may control the audio output device 104 to concurrently audibly emit the first and second audio streams 302A, 302B during a remote collaboration event.

In an example, the controller 102 may control the audio output device 104 to emit the first audio stream 302A via only a first speaker 120A of the audio output device 104, and to audibly emit the second audio stream 302B via at least a second speaker 120B of the audio output device 104. In another example, the controller 102 may control the audio output device 104 to emit the first audio stream 302A via a first output distribution among multiple speakers 120 of the audio output device 104, and to emit the second audio stream 302B via a second output distribution among the multiple speakers 120 of the audio output device 104. The audio output device 104 may allocate power to the multiple speakers 120 differently according to the first output distribution than according to the second output distribution to enable spatial audio differentiation of the first and second audio streams 302A, 302B.

Optionally, the method may include receiving a user command signal. In response to receiving the user command signal, the controller 102 may assign the first audio stream 302A to the first output setting 308A based on both the first source information 306 and the user command signal. Alternatively, the controller 102 may reassign the first audio stream 302A to a third output setting 308C based on the user command signal.

The audio augmentation system and method described herein provides content-independent auditory differentiation of audio streams to provide identifying information to a listener. For example, the system may broadcast audio to create observable perceptions of the audio emanating from different positions. The system may be customizable to enable a user to select specific streams to isolate and/or to select how different streams are acoustically differentiated.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An audio augmentation system comprising:
   a memory configured to store program instructions; and
   one or more processors operably connected to the memory, wherein the program instructions are executable by the one or more processors to:
      obtain a first audio stream generated by a first remote audio input device and a second audio stream generated by a second remote audio input device, wherein the first audio stream is tagged with first source information and the second audio stream is tagged with second source information, wherein the first source information identifies a first entity affiliated with at least one of the first remote audio input device or a first user that vocalizes audio captured by the first remote audio input device, and the second source information identifies a second entity affiliated with at least one of the second remote audio input device or a second user that vocalizes audio captured by the second remote audio input device;
      assign the first audio stream to a first output setting based on the first entity, and assign the second audio stream to a second output setting based on the second entity, the second output setting different from the first output setting; and
      control an audio output device to audibly emit the first audio stream according to the first output setting and the second audio stream according to the second output setting to acoustically differentiate the first audio stream from the second audio stream, independent of content of each of the first and second audio streams.

2. The audio augmentation system of claim 1, wherein the one or more processors are configured to control the audio output device to concurrently audibly emit the first and second audio streams during a remote collaboration event.

3. The audio augmentation system of claim 1, wherein the first output setting includes different audio properties than the second output setting, the audio properties representing one or more of volume settings, audio-out channels of the audio output device, output distributions among multiple speakers of the audio output device, supplementary background noises, or audio distortions.

4. The audio augmentation system of claim 1, wherein the one or more processors are configured to assign the first audio stream to the first output setting for the audio output device to emit the first audio stream via only a first speaker of the audio output device, and are configured to assign the second audio stream to the second output setting for the audio output device to emit the second audio stream via at least a second speaker of the audio output device.

5. The audio augmentation system of claim 1, wherein the one or more processors are configured to control the audio output device to emit the first audio stream via a first output distribution among multiple speakers of the audio output device, and to emit the second audio stream via a second output distribution among the multiple speakers of the audio output device, wherein the audio output device according to the first output distribution allocates power to the multiple speakers differently than according to the second output distribution to enable spatial audio differentiation of the first and second audio streams.

6. The audio augmentation system of claim 1, wherein the first entity is a first company, group, or association that at least one of employs the first user or controls the first remote audio input device, and the second entity is a second company, group, or association that at least one of employs the second user or controls the second remote audio input device.

7. The audio augmentation system of claim 1, wherein the one or more processors are configured to receive a user command signal and to assign the first audio stream to the first output setting based on both the first entity and the user command signal.

8. The audio augmentation system of claim 1, wherein the one or more processors are configured to receive a user command signal and to reassign the first audio stream to a third output setting based on the user command signal.

9. The audio augmentation system of claim 1, wherein the first source information identifies a position of the first user in a virtual environment, and the second source information identifies a position of the second user in the virtual environment,
  wherein the one or more processors assign the first audio stream to the first output setting based on the position of the first user in the virtual environment, and assign the second audio stream to the second output setting based on the position of the second user in the virtual environment.

10. The audio augmentation system of claim 1, wherein the first output setting includes a supplementary background noise that is added to the first audio stream, and the second output setting does not include any supplementary background noise added to the second audio stream.

11. A method comprising:
  obtaining a first audio stream generated by a first remote audio input device and a second audio stream generated by a second remote audio input device, wherein the first audio stream is tagged with first source information and the second audio stream is tagged with second source information, wherein the first source information identifies a first entity affiliated with at least one of the first remote audio input device or a first user that vocalizes audio captured by the first remote audio input device, and the second source information identifies a second entity affiliated with at least one of the second remote audio input device or a second user that vocalizes audio captured by the second remote audio input device;
  assigning the first audio stream to a first output setting based on the first entity, and assigning the second audio stream to a second output setting based on the second entity, the second output setting different from the first output setting; and
  controlling an audio output device to audibly emit the first audio stream according to the first output setting and the second audio stream according to the second output setting to acoustically differentiate the first audio stream from the second audio stream, independent of content of each of the first and second audio streams.

12. The method of claim 11, wherein controlling the audio output device comprises controlling the audio output device to concurrently audibly emit the first and second audio streams during a remote collaboration event.

13. The method of claim 11, wherein assigning the first audio stream to the first output setting and assigning the second audio stream to the second output setting comprises assigning different audio properties for audibly emitting the first audio stream relative to the second audio stream, the audio properties representing one or more of volume settings, audio-out channels of the audio output device, output distributions among multiple speakers of the audio output device, supplementary background noises, or audio distortions.

14. The method of claim 11, wherein controlling the audio output device to audibly emit the first audio stream according to the first output setting comprises controlling the audio output device to emit the first audio stream via only a first speaker of the audio output device, and controlling the audio output device to audibly emit the second audio stream according to the second output setting comprises controlling the audio output device to emit the second audio stream via at least a second speaker of the audio output device.

15. The method of claim 11, wherein controlling the audio output device to audibly emit the first audio stream according to the first output setting comprises controlling the audio output device to emit the first audio stream via a first output distribution among multiple speakers of the audio output device, and to emit the second audio stream via a second output distribution among the multiple speakers of the audio output device, wherein the audio output device according to the first output distribution allocates power to the multiple speakers differently than according to the second output distribution to enable spatial audio differentiation of the first and second audio streams.

16. The method of claim 11, wherein the first source information identifies a position of the first user in a virtual environment, and the second source information identifies a position of the second user in the virtual environment,
  wherein the first audio stream is assigned to the first output setting based on the position of the first user in the virtual environment, and the second audio stream is assigned to the second output setting based on the position of the second user in the virtual environment.

17. The method of claim 11, further comprising:
  receiving a user command signal; and
  either (i) assigning the first audio stream to the first output setting based on both the first entity and the user command signal, or (ii) reassigning the first audio stream to a third output setting based on the user command signal.

18. A computer program product comprising a non-transitory computer readable storage medium, the non-transitory computer readable storage medium comprising computer executable code configured to be executed by one or more processors to:

obtain a first audio stream generated by a first remote audio input device and a second audio stream generated by a second remote audio input device;

input the first audio stream to a machine learning algorithm configured to monitor the first audio stream and output first source information that characterizes the first audio stream;

input the second audio stream to the machine learning algorithm that is configured to monitor the second audio stream and output second source information that characterizes the second audio stream;

assign the first audio stream to a first output setting based on the first source information output by the machine learning algorithm, and assign the second audio stream to a second output setting based on the second source information output by the machine learning algorithm, the second output setting different from the first output setting; and control an audio output device to audibly emit the first audio stream according to the first output setting and the second audio stream according to the second output setting to acoustically differentiate the first audio stream from the second audio stream, independent of content of each of the first and second audio streams.

19. The computer program product of claim 18, wherein the first output setting includes different audio properties than the second output setting, the audio properties representing one or more of volume settings, audio-out channels of the audio output device, output distributions among multiple speakers of the audio output device, supplementary background noises, or audio distortions.

20. The computer program product of claim 18, wherein each of the first source information and the second source information independently indicates at least one of (i) significant background chatter in the respective audio stream, (ii) a lead role of a user that vocalizes audio captured in the respective audio stream, or (iii) a distractive status of a user that vocalizes audio captured in the respective audio stream.

* * * * *